United States Patent
Brett et al.

(10) Patent No.: US 10,649,946 B1
(45) Date of Patent: May 12, 2020

(54) FAST LINK TURNAROUND USING MIPI D-PHY

(71) Applicant: NXP USA, Inc., Austin, TX (US)

(72) Inventors: Maik Brett, Taufkirchen (DE); Naveen K. Jain, Panipat (IN); Shreya Singh, Ranchi (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/248,356

(22) Filed: Jan. 15, 2019

(51) Int. Cl.
  *G06F 13/42*  (2006.01)
  *G06F 1/3296*  (2019.01)

(52) U.S. Cl.
  CPC ........ *G06F 13/4221* (2013.01); *G06F 1/3296* (2013.01)

(58) Field of Classification Search
  USPC .......................................................... 710/105
  See application file for complete search history.

(56) References Cited

U.S. PATENT DOCUMENTS

| | | | |
|---|---|---|---|
| 2006/0069812 A1 | 3/2006 | Osborne | |
| 2010/0091921 A1 | 4/2010 | Den Besten et al. | |
| 2010/0232304 A1* | 9/2010 | den Besten | G06F 13/4072 370/252 |
| 2014/0094128 A1* | 4/2014 | Yu | H04B 1/16 455/68 |
| 2015/0098537 A1 | 4/2015 | Sengoku | |
| 2017/0116150 A1* | 4/2017 | Wiley | G06F 13/4282 |
| 2017/0118039 A1* | 4/2017 | Wiley | G06F 13/42 |
| 2017/0154009 A1 | 6/2017 | Zhu et al. | |

FOREIGN PATENT DOCUMENTS

WO  2017095534 A1  6/2017

OTHER PUBLICATIONS

Mipi alliance MIPI Alliance Specification for D-Phy Version 1.1—Nov. 7, 2011 (Year: 2011).*
Tektronix, Understanding and Performing MIPI D-PHY Physical Layer, CSI and DSI Protocol Layer Testing, Application Note, 2010.
M. Minegishi, splcd.com, Japan Display Inc., LPM089A128A Specifications, Apr. 8, 2014.
NXP Semiconductors, NX3DV642 3-lane high-speed MIPI compatible switch, Rev. 1, Product Data Sheet, Aug. 20, 2012.
U.S. Appl. No. 16/821,954, filed Mar. 17, 2020.

* cited by examiner

Primary Examiner — Paul R. Myers

(57) ABSTRACT

A system, method, and apparatus are provided for operating a device to receive a first signaling state sequence on a multi-wire interface within a first voltage range to cause the device to transition to a high-speed communication mode for receiving high-speed data on the multi-wire interface within a second, smaller voltage range before returning to a low-power communication mode when the device receives on the multi-wire interface a second sequence of two signaling states within the first voltage range to signal a turnaround command without requiring any additional signaling state within the first voltage range, where the turnaround command enables the device to transmit data from the device over the multi-wire interface by transmitting on the multi-wire interface the first sequence of signaling states within the first voltage range to cause the device to transition to a high-speed communication mode for transmitting data from the device over the multi-wire interface.

20 Claims, 5 Drawing Sheets

FAST LINK TURNAROUND USING MIPI D-PHY

BACKGROUND OF THE INVENTION

Field of the Invention

The present invention is directed in general to field of data communications interfaces. In one aspect, the present invention relates to an apparatus, system and method for communicating in multiple modes and/or speeds between integrated circuit devices.

Description of the Related Art

With increasing demand for product applications where different integrated circuit devices and components are assembled and/or connected to work together, communication interface protocols are required for communicating between interconnected devices and components. For example, the Mobile Industry Processor Interface (MIPI) Alliance defines protocols for a camera serial interface (CSI) and a display serial interface (DSI) for communications between an application processor and a camera or display component of a mobile device. In the MIPI protocol, a low-level physical-layer (PHY) interface for display components MIPI D-PHY is defined for high-speed modes and low-power modes of communication, where the MIPI D-PHY high-speed mode uses a plurality of 2-wire lanes to carry low-voltage differential signals, and where the low-power mode of MIPI D-PHY provides lower rates than the high-speed mode and transmits signals at higher voltages that are not detectable by receivers configured for low-power operation. One of the features of the MIPI D-PHY specification is that the transmission direction of a bi-directional Data Lane can be swapped by means of a "Link Turnaround" procedure which enables information transfer in the opposite direction of the current direction. While the turnaround procedure is the same for either a change from Forward-to-Reverse direction or Reverse-to-Forward direction, the MIPI D-PHY specification does require a specified sequence of low-power mode commands be issued before the end-to-end turnaround procedure can change transmission directions (e.g., from master to slave or slave to master). Under the MIPI D-PHY specification, the specified sequence of low-power mode commands (LP10, LP00, LP10, LP00) requires a minimum turnaround time (e.g., approximately 550 ns-650 ns) for the turnaround overhead that is not available for data transmission, thereby constraining the ability of applications to perform real time configuration of the master device during interpacket gaps in forward transmission from the master device to the slave device.

While solutions have been proposed for reducing the turnaround time by including a turnaround command in the high speed transmission sequence, such solutions are prone to data transmission errors since the DPHY standard does not provide for bit error identification in the PHY layer during high speed transmission, meaning that any errors in received bits must be handled via the protocol layer by the DPHY itself while in the low power/command mode. As a result, any error in a turnaround command sent in the high speed transmission sequence might cause no link reversal because of bit corruption anywhere in the HS packet (not necessarily the turnaround command itself) unless identified by the protocol layer. As seen from the foregoing, the existing solutions for quickly and efficiently implementing turnaround commands that is robust against errors are extremely difficult at a practical level by virtue of the challenges with meeting the performance requirements for allowing real time and reliable configuration of devices in minimal time using turnaround and reverse high speed communication.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

An apparatus, system, architecture, methodology, and program code are described for using a specified low power command sequence to modify a MIPI D-PHY interface protocol, thereby providing a reliable turnaround procedure having a shorter turnaround command duration. In selected embodiments, a master device (e.g., a radar sensor) transmits a first code word to a slave device (e.g., a microcontroller) while a physical interface between the devices is configured to operate in a low-power mode of operation. In response to the first code word, the devices reconfigure the physical interface to operate in a high-speed mode for transmitting data from the master device to the slave device until the master device signals the end of high-speed mode of operation. Upon conclusion of high speed data transmission, the master device and slave device configure the physical interface to return to the low-power mode of operation, at which point the master device transmits a second code word signaling a turnaround command to the slave device while the physical interface operates in the low-power mode of operation, where the second code word includes only a specified sequence of two low-power signaling states (e.g., LP10, LP00) for reconfiguring the physical interface to operate in high-speed mode of operation to transmit data from the slave device (e.g., microcontroller) to the master device (e.g., a radar sensor) during interpacket gaps of the forward direction high-speed packets. Using the specified sequence of two low-power signaling states to implicitly signal the turnaround command, the turnaround time using DPHY interface can be reduced as much as 250 ns in one direction, thereby enabling real time updates in the reverse direction to be handled in a more effective and reliable way.

Figure 1:
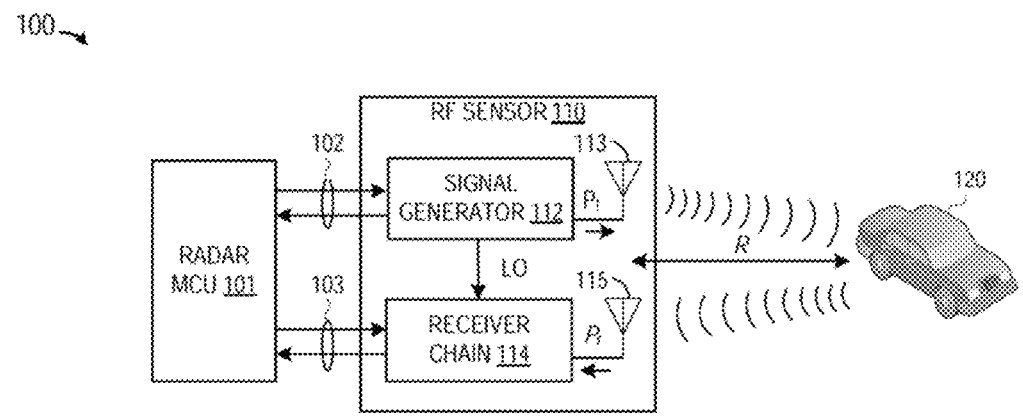
FIG. 1 depicts a system block diagram of a microcontroller and an external front end device connected to monitor a distance measure by exchanging data and commands over a communication interface in accordance with selected embodiments of the present disclosure.
Figure 1:
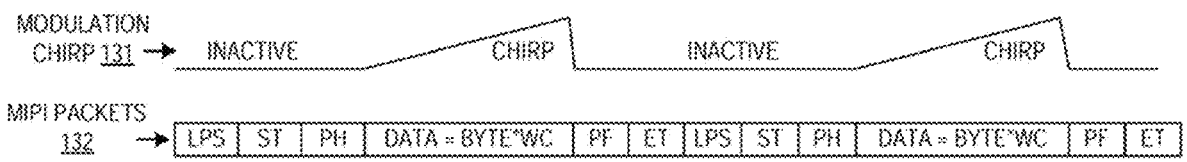

To provide additional details for an improved contextual understanding of the present disclosure, reference is now made to FIG. 1 which depicts a system block diagram 100 of microcontroller block 101 and an external front end block 110 connected to monitor a distance measure R by exchanging data and commands over a communication interface in accordance with selected embodiments of the present disclosure. In an example embodiment, the microcontroller block 101 may be embodied as a radar microcontroller unit 101 that controls the operation of an RF front end sensor 110 which includes a signal generator 112 and transmit antenna(s) 113, and which also includes one or more receiver chains 114 and receive antenna(s) 115. In operation, the signal generator 112 may be controlled by the radar MCU 101 to create and transmit one or more transmit pulses Pt, such as by transmitting a sequence of modulation chirps 131, each having a chirp duration (e.g., up to 600 μs) followed by an inactive period (e.g., 3 μs). As the transmitted pulses are reflected back to the RF sensor 110, they are received at the receive antenna(s) 115 and processed by the receiver chain(s) 114 which performs signal conditioning and analog-to-digital transformation into digital samples. At the radar MCU 101, the digital samples are converted into frequency information and position-related information (such as distance, relative velocity, angle of arrival) and/or other advanced functions (e.g., classification, detection, tracking, etc.) is calculated for any target 120 (e.g., one or more vehicles).

At the communication interface 102, 103 between the radar MCU 101 and the RF sensor front end 110, the relative timing of the transmit pulses Pt or chirps 131 in relation to the MIPI packets 132 shows that each high speed DATA packet is preceded by a start of high speed transmission (ST) packet and a packet header (PH) packet. In addition, each high speed DATA packet is followed by a packet footer (PF) packet, an end of high speed transmission (ET) packet, and a low power state packet (LPS). Between active modulation chirps 131, the duration of each inactive state as short as 3 μs when the chirp durations extend up to 600 μs, leaving very little time for the intervening MIPI packets 132 (PF, ET, LPS, ST, PH).

In accordance with selected embodiments of the present disclosure, a microcontroller apparatus, system and method may employ some combination of differential and single-ended encoding for communicating between the radar MCU 101 and RF sensor 110. In one example, the MIPI Alliance-defined D-PHY physical layer interface technology may be used to connect the radar sensor 110 to an application processor device 101 over the communication interface line(s) 102, 103. The D-PHY interface can switch between a differential (High-speed) mode and a single-ended (Low Power) mode in real time as needed to facilitate the transfer of large amounts of data or to conserve power and prolong battery life. The D-PHY interface is capable of operating in simplex or duplex configuration with single data lane or multiple data lanes with a unidirectional (Master to Slave) clock lane.

Figure 2:
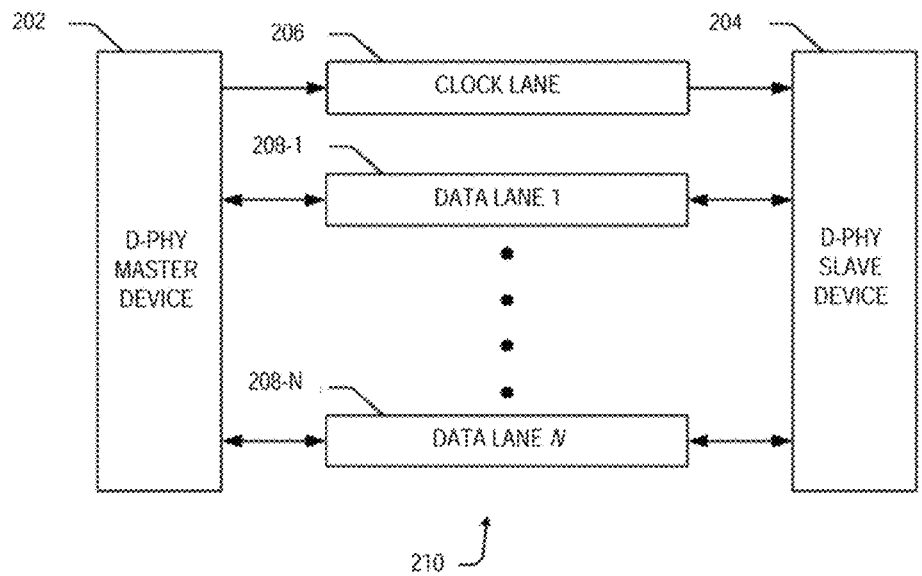
FIG. 2 illustrates a generalized D-PHY configuration that includes a master device and a slave device connected to transmit data over one or more signaling lanes.

To provide additional details of the D-PHY interface, reference is now made to FIG. 2 which illustrates a generalized D-PHY configuration 200 that includes a master device 202 and a slave device 204 connected to transmit data over one or more signaling lanes 208. As illustrated, the master device 202 generates clock signals that control transmissions on the wires 210. A clock signal is transmitted on a clock lane 206 and data is transmitted in one or more data lanes 208-1, 208-N. The number of data lanes 208-1, 208-N that are provided or active in a device may be dynamically configured based on application needs, volumes of data to be transferred and power conservation needs. In the D-PHY implementation of each data communication link 208, differential high speed signaling typically may be achieved by transmitting information electrically using two complementary signals sent on a differential pair of wires in order to reduce electromagnetic interference (EMI) by canceling the effect of common-mode interference that affects both wires in a differential pair. And when the communication link 208 is operated in a Low Power mode, signals may be transmitted on single wire data and/or clock lanes, such as by configuring the signal line drivers so that only one of the wires in a different pair of wires of an active lane is driven.

Figure 3:
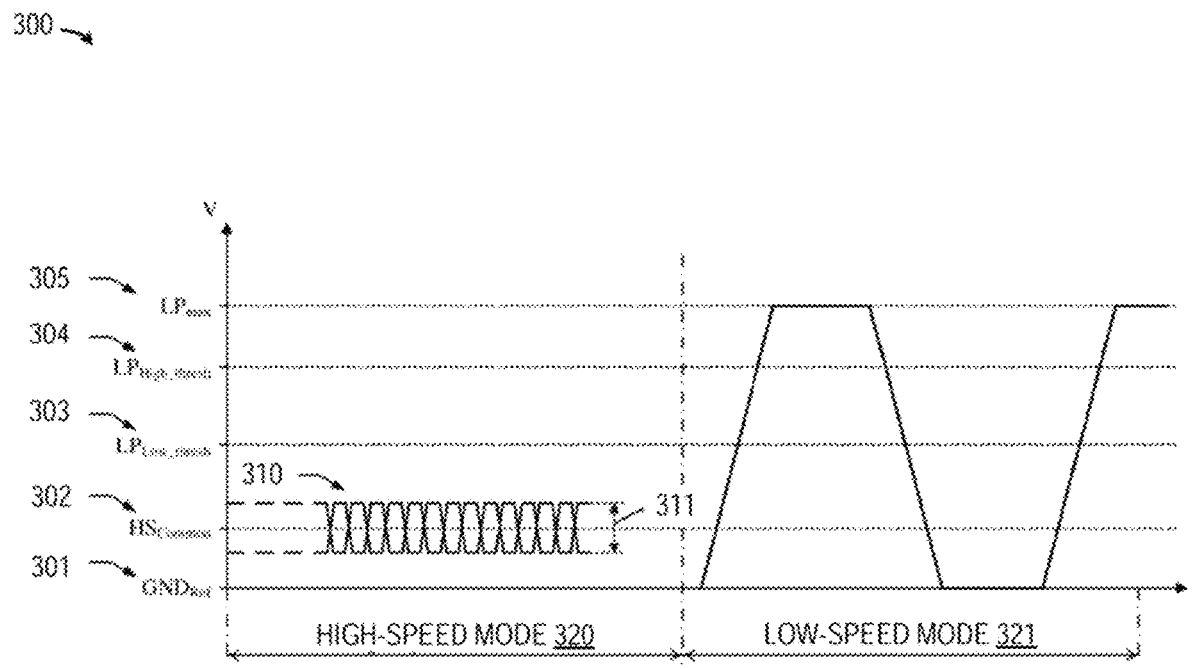
FIG. 3 graphically illustrates high-speed and low-power signaling in a D-PHY interface.

To provide additional details of the D-PHY interface, reference is now made to FIG. 3 which depicts a graphical representation 300 of waveforms 301-305 illustrating certain aspects of signaling in the D-PHY interface which supports a high-speed communication mode 320 and a low-power communication mode 321. Data is transmitted at a significantly lower rate in the low-power communication mode 321 than in the high-speed communication mode 320, thereby reducing power consumption. The high-speed communication mode 320 and the low-power communication mode 321 operate at different voltage levels and voltage ranges when transmitting signal using the same wires of a serial bus.

In the high-speed communication mode 320, signals are centered on a high-speed common ($HS_{COMMON}$) voltage level 302, which is offset from a reference ground voltage level 301. Signals in the high-speed communication mode 320 have a voltage range 311 that ensures that high-speed signals 310 do not exceed a logic low threshold voltage level ($LP_{LOW\_THRESHOLD}$) 303, which defines the upper limit for logic low in the low-power communication mode 321. In one D-PHY example, the $HS_{COMMON}$ voltage level 302 may be nominally defined to be 200 millivolts (mV), and the voltage range 311 for high-speed signals may be nominally defined to be 200 mV. In the low-power communication mode 321, signals switch between a maximum low-power ($LP_{MAX}$) voltage level 305 and the reference ground voltage level 301. The logic low voltage levels $LP_{LOW\_THRESHOLD}$ 303 and the logic high threshold voltage level ($LP_{HIGH\_THRESHOLD}$) 304 define the switching voltage levels for high-to-low transitions and low- to high transitions, respectively. In one example, the maximum low-power ($LP_{MAX}$) voltage level 305 may be nominally defined at 1.2 Volts (V).

Figure 4:
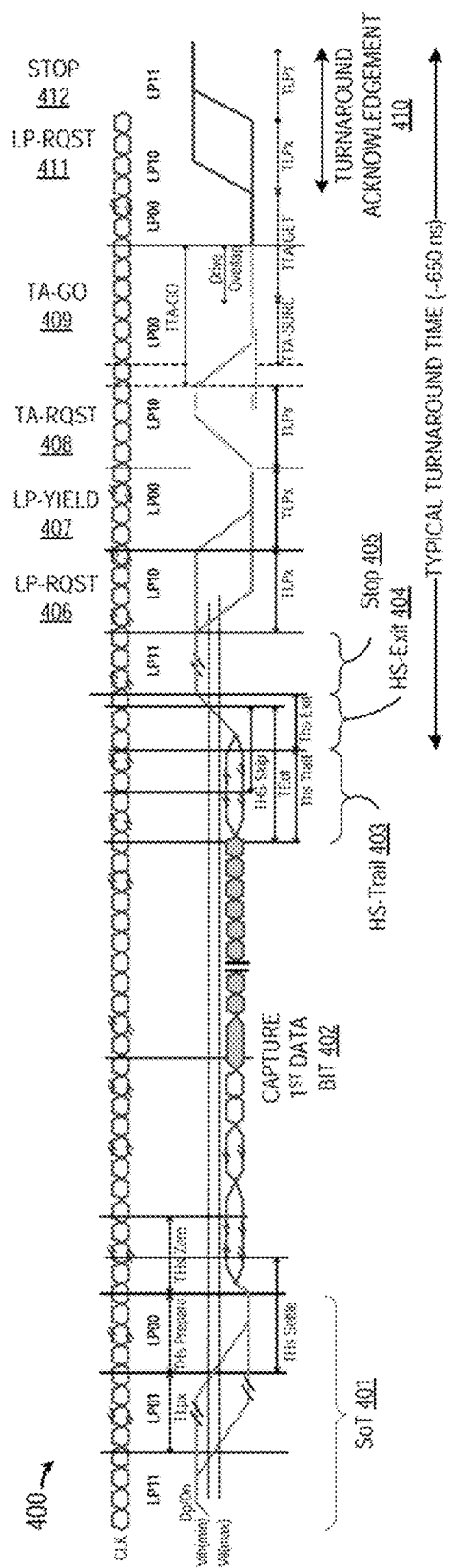
FIG. 4 illustrates transitions between modes of communication and turnaround procedures in accordance with a D-PHY interface specification.

Turning now to FIG. 4, there is depicted a timing diagram 400 which shows the transitions between modes of communication and turnaround procedures in accordance with a D-PHY interface specification using low-power mode signaling. In the example timing diagram 400, a high-speed burst begins after transmission of a Start of Transmission (SoT) sequence 401 that may include LP codes (LP11, LP01, LP00). In high-speed communication mode, low power transition begins with a low power transition phase LPX having a duration $T_{LPX}$ and a high speed preparation phase HsPrepare having a duration $T_{HsPrepare}$. Allowing for settling time $T_{HSSettle}$, data transmission begins after a high-speed zero phase (HS-Zero) and a high-speed Sync Word (HS Sy) when the first data bit is captured to start the High-Speed Forward Data phase. Upon completion of the high-speed data transmission from the master to the slave, the High-Speed Trail (HS-Trail) phase 403 and High-Speed Exit phase 404 occur, followed by transmission of one or more specified signaling states to return the communication link to low-power mode. In the D-PHY interface specification, the return to the low-power mode may be accomplished when the master device issues a first Stop state 405 using the voltage levels defined for the low-power mode (e.g., LP11).

When a high-speed mode bus turnaround is desired, conventional D-PHY devices use a defined low-power mode signaling sequence to provide communication opportunities for slave devices at high-speed data rates when the D-PHY interface provides a bidirectional lane between a master device and a slave device. The transmission direction of a bidirectional lane can be changed using a procedure defined by conventional D-PHY protocols to toggle the direction of data flow over the D-PHY link, such that the same procedure is executed to change data flow from a master to slave (forward direction) to data flow from the slave to the master (reverse direction) and to change data flow from the reverse direction to the forward direction. The timing diagram 400 illustrates execution of a change of direction from forward direction to reverse direction which is initiated when the master device transmits a Stop state 405, a first Low-Power Request state 406 (having duration $T_{LPX}$), a first bridge or Low-Power Yield state 407 (having duration $T_{LPX}$), second Low-Power Request (or Turnaround Request) state 408 (having duration $T_{LPX}$), and a second bridge or Turnaround Go state 409 (having duration $T_{TA-GO}$). The master device asserts the second bridge or Turnaround Go state 409 for a predefined minimum period of time ($T_{TA-GO}$) before releasing the interface when it ceases to drive the two wires of the interface. The slave device waits for a period of time ($T_{TA-SURE}$) after commencement of the second bridge or Turnaround Go state 409 before driving the wires so that, for some period of time, a Drive Overlap occurs when both the master device and slave device may be driving the wires of the interface. To provide turnaround acknowledgement 410, the slave device then drives a third Low-Power Request state 411 which the master device may identify as an acknowledgement that the slave device has taken control of the interface. The slave device drives a second Stop state 412 to confirm completion of bus turnaround, after which point, the slave device can drive high speed data over the lines in a half-duplex operation, thereby providing an opportunity for the slave device (e.g., 101) to perform real time configuration updates on the master device (e.g., 110) during inter packet gaps of the forward direction high speed packet.

Based on the MIPI D-PHY standard, the amount of time required for execution of a lane turnaround procedures that is initiated after high speed transmission is approximately 550 ns, or 650 ns when including the THs-Exit phase 404 and the turnaround acknowledgement time 410. Due to the duration of the turnaround time under the MIPI D-PHY standard, there is limited time available for sending data bits in the reverse direction. The large turnaround time also makes real time updates via turnaround difficult as the duration of the interpacket gaps are reduced.

Figure 5:
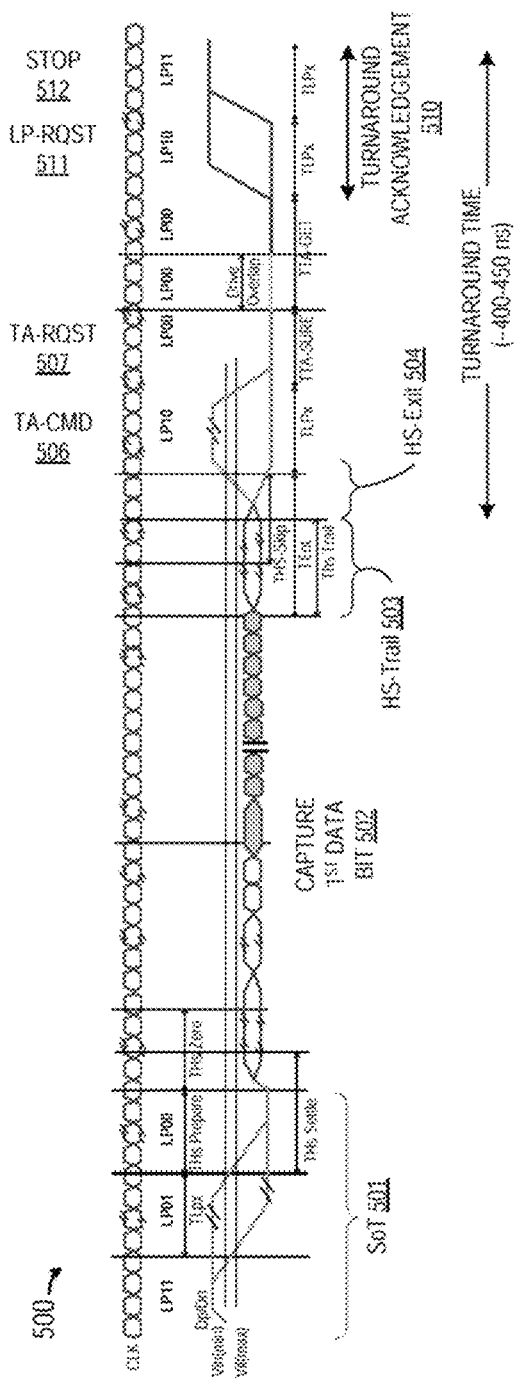
FIG. 5 illustrates transitions between modes of communication and turnaround procedures in a D-PHY interface specification that is adapted in accordance with selected embodiments of the present disclosure.

To address these limitations and others that will be apparent to persons skilled in the art based on the foregoing description, there is disclosed herein an apparatus, system, architecture, methodology, and program code for using a specified low power command sequence to modify a MIPI D-PHY interface protocol and provide an altered low power turnaround procedure which leads to reduction in turnaround command duration. To illustrate selected embodiments of the disclosed solutions, reference is now made to FIG. 5 which depicts a timing diagram 500 which shows the transitions between modes of communication and turnaround procedures in a D-PHY interface specification using low-power mode signaling in accordance with the present disclosure. In the example timing diagram 500, a high-speed burst begins after transmission of a Start of Transmission (SoT) sequence 501 that may include LP codes (LP11, LP01, LP00). In high-speed communication mode, low power transition begins with a low power transition phase LPX having a duration Tux and a high-speed preparation phase HsPrepare having a duration $T_{HsPrepare}$. Allowing for settling time $T_{HSSettle}$, data transmission begins after a high-speed zero phase (HS-Zero) and a high-speed Sync Word (HS Sy) when the first data bit is captured to start the High-Speed Forward Data phase. Upon completion of the high-speed data transmission from the master to the slave, the High-Speed Trail (HS-Trail) phase 503 and High-Speed Exit phase 504 occur, followed by transmission of one or more specified signaling states to return the communication link to low-power mode.

However, instead of using the low-power command LP11 to issue a Stop state (e.g., 405) as specified in the D-PHY interface specification and thereby return the lane to the low-power mode, the master device may be configured to implicitly assume there will be a turnaround command in the low-power mode after each forward direction high-speed packet, thereby enabling the master device to transmit a specified sequence of two low-power signaling states (e.g., LP10, LP00) to signal a turnaround command to the slave device while the physical interface operates in the low-power mode of operation, thereby reconfiguring the physical interface to operate in high-speed mode of operation to transmit data from the slave device (e.g., microcontroller) to the master device (e.g., a radar sensor) during interpacket gaps of the forward direction high-speed packets. As depicted in the timing diagram 500, the execution of a change of direction from forward direction to reverse direction is initiated when the master device transmits a first low-power turnaround command 506 having a first state (e.g., LP10) and duration (e.g., $T_{LPX}$), followed by a bridge or Turnaround Go command 507 having a second state (e.g., LP00) and duration (e.g., $T_{TA-SURE}$). The master device asserts the bridge or Turnaround Go state 507 for a predefined minimum period of time before releasing the interface when it ceases to drive the two wires of the interface. The slave device waits for a period of time ($T_{TA-SURE}$) after commencement of the bridge or Turnaround Go state 507 before driving the wires so that, for some period of time, a Drive Overlap occurs when both the master device and slave device may be driving the wires of the interface.

If necessary, a turnaround acknowledgement 510 may be provided by configuring the slave device to drive a Low-Power Request state 511 (which the master device may identify as an acknowledgement that the slave device has taken control of the interface) and a Stop state 512 to confirm completion of bus turnaround, after which point, the slave device can drive high speed data over the lines in a half-duplex operation. In this turnaround acknowledgement case, the turnaround time is reduced to approximately 450 ns, thereby providing a greater opportunity for the slave device (e.g., 101) to perform real time configuration updates on the master device (e.g., 110) since the inter packet gaps of the forward direction high speed packet how have approximately 200 ns of extra time due to the shorter turnaround sequence.

On the other hand, the master device and slave device may be configured to operate without requiring a turnaround acknowledgement, in which case the slave device is configured to drive directly from the bridge or Turnaround Go command 507 (LP00) to the Stop state 512 (e.g., LP11), after which point, the slave device can drive high speed data over the lines in a half-duplex operation. In this case where there is no turnaround acknowledgement required, the turnaround time is reduced to approximately 400 ns, thereby providing a greater opportunity for the slave device (e.g., 101) to perform real time configuration updates on the master device (e.g., 110) since the inter packet gaps of the forward direction high speed packet have approximately 250 ns of extra time due to the shorter turnaround sequence.

Figure 6A:
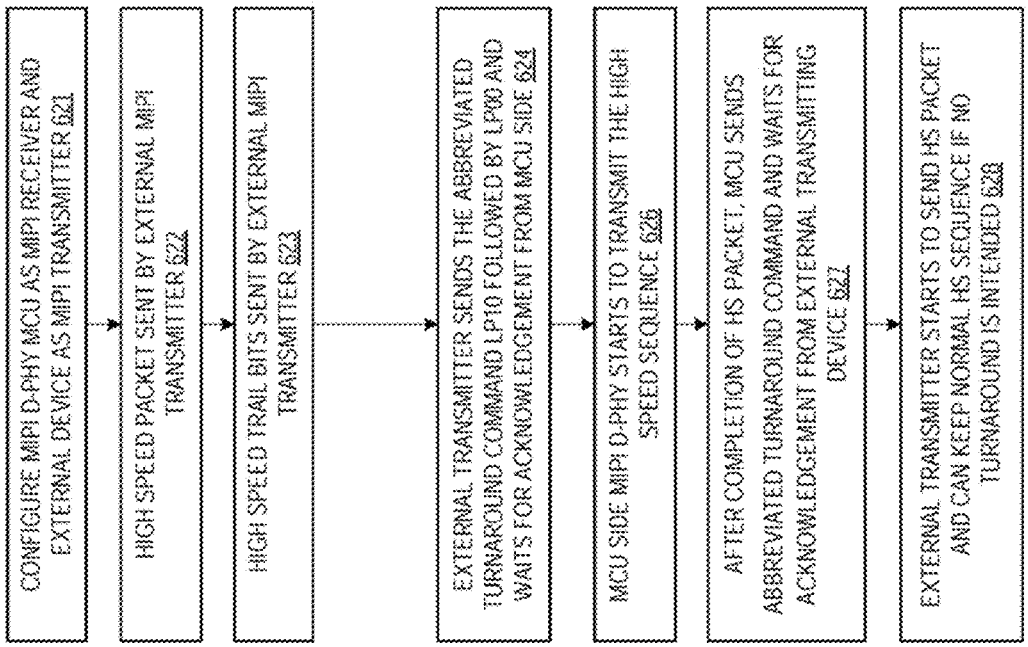
FIG. 6A depicts a simplified flow chart showing the logic for a turnaround procedure for transitioning between modes of communication in accordance with a D-PHY interface specification.

Referring now to FIG. 6A, there is depicted a simplified flow chart diagram 610 showing the logic for a turnaround procedure for transitioning between modes of communication in accordance with a D-PHY interface specification. In the flow diagram 610, the method starts at step 611 when the MIPI D-PHY configures the MCU as the MIPI receiver (or slave) and configures the external device as the MIPI transmitter (or master). In selected embodiments, the configuration at step 611 is performed by the master device which uses turnaround control logic to transmit a first sequence of signaling states (e.g., LP11, LP01, LP00) on the multi-wire interface while operating in a low-power communication mode, where the sequence of signaling states are transmitted within a first voltage range to cause a receiver to transition to a high-speed communication mode.

At step 612, the external MIPI transmitter (or master device) sends a high speed packet to the MIPI receiver (or slave). And at step 613, the external MIPI transmitter (or master device) sends high speed trail bits to the MIPI receiver (or slave). In selected embodiments, the data transmission at steps 612 and 613 is performed by transmitting first high-speed data over the multi-wire interface to the receiver while operating in the high-speed communication mode, where the first high-speed data is transmitted within a second voltage range that is less than the first voltage range.

At step 614, the external MIPI transmitter (or master device) drives a first signaling state LP 11 on the multi-wire interface for a minimum high-speed exit duration ($T_{HS\text{-}EXIT}$) to allow the high-speed data transmission to complete. In selected embodiments, the duration of the drive time at step 614 is controlled to allow the multi-wire interface lines to be disconnected and driven to the first signaling state.

At step 615, the external MIPI transmitter (or master device) drives a second sequence of signaling states specified by the D-PHY standard to signal a turnaround command, and then waits for an acknowledgement signaling state on the multi-wire interface. In selected embodiments, the master device uses turnaround control logic to transmit the second sequence of signaling states (LP10, LP00, LP10, LP00) on the multi-wire interface while operating in a low-power communication mode to cause the MIPI receiver (or slave device) to send a turnaround acknowledgment signal.

At step 616, the MIPI receiver (or slave) is configured to start sending high speed data over the MIPI D-PHY to the external device as the MIPI receiver (or master). In selected embodiments, the configuration at step 616 is performed by the master device which uses turnaround control logic to transmit the first sequence of signaling states (e.g., LP11, LP01, LP00) on the multi-wire interface while operating in a low-power communication mode, followed by transmission of a high-speed data packet in the high-speed communication mode.

At step 617, the MIPI receiver (or slave) waits until completing transmission of the high-speed data to the MIPI transmitter, and then drives the second sequence of signaling states specified by the D-PHY standard to signal a turnaround command before waiting for an acknowledgement signaling on the multi-wire interface from the MIPI transmitter. In selected embodiments, the MIPI receiver device uses turnaround control logic to transmit the second sequence of signaling states (LP10, LP00, LP10, LP00) on the multi-wire interface while operating in a low-power communication mode to cause the MIPI transmitter (or master device) to send a turnaround acknowledgment signal.

At step 618, the external MIPI transmitter (or master device) starts to send a high-speed packet to the MIPI receiver (or slave), such as by configuring the master device to transmit the first sequence of signaling states (e.g., LP11, LP01, LP00) on the multi-wire interface while operating in a low-power communication mode. If no turnaround is intended, the processing at step 618 can continue with the normal high-speed data transmission sequence.

Figure 6B:
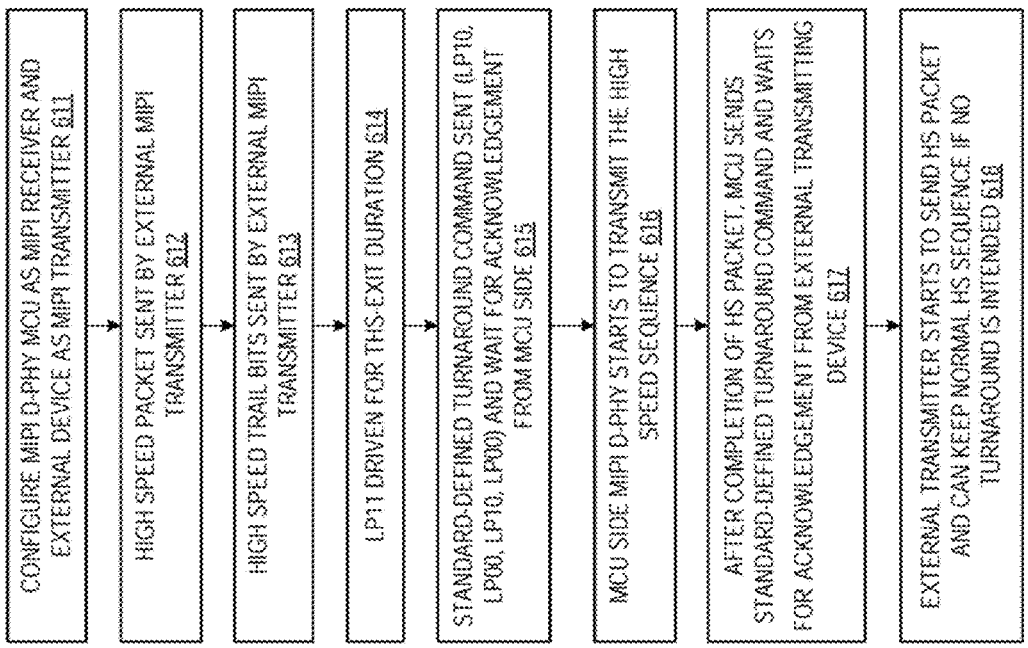
FIG. 6B depicts a simplified flow chart showing the logic for a turnaround procedure for transitioning between modes of communication in a D-PHY interface specification that is adapted in accordance with selected embodiments of the present disclosure.

Referring now to FIG. 6B, there is depicted a simplified flow chart diagram 620 showing the logic for a turnaround procedure for transitioning between modes of communication in accordance with a D-PHY interface specification that is adapted to use an abbreviated turnaround command. In the flow diagram 620, the method starts at step 621 when the MIPI D-PHY configures the MCU as the MIPI receiver (or slave) and configures the external device as the MIPI transmitter (or master). In selected embodiments, the configuration at step 621 is performed by the master device which uses turnaround control logic to transmit a first sequence of signaling states (e.g., LP11, LP01, LP00) on the multi-wire interface while operating in a low-power communication mode, where the sequence of signaling states are transmitted within a first voltage range to cause a receiver to transition to a high-speed communication mode.

At step 622, the external MIPI transmitter (or master device) sends a high-speed packet to the MIPI receiver (or slave). And at step 623, the external MIPI transmitter (or master device) sends high speed trail bits to the MIPI receiver (or slave). In selected embodiments, the data transmission at steps 622 and 623 is performed by transmitting first high-speed data over the multi-wire interface to the receiver while operating in the high-speed communication mode, where the first high-speed data is transmitted within a second voltage range that is less than the first voltage range.

At step 624, the external MIPI transmitter (or master device) bypasses or skips the standard-defined step of driving a first signaling state LP11 on the multi-wire interface, and instead sends an abbreviated turnaround command by driving a specified code word sequence which signals a turnaround command to the slave device while the physical interface operates in the low-power mode of operation. In selected embodiments, the master device uses turnaround control logic to transmit the specified code word sequence of two low-power signaling states (e.g., LP10, LP00) on the multi-wire interface while operating in a low-power communication mode. In selected embodiments, the master device may also be configured to wait for an acknowledgement signaling state on the multi-wire interface, but this is not necessarily required in all embodiments.

At step 626, the MIPI receiver (or slave) is configured to start sending high speed data over the MIPI D-PHY to the external device as the MIPI receiver (or master). In selected embodiments, the configuration at step 626 is performed by the master device which uses turnaround control logic to transmit the first sequence of signaling states (e.g., LP11, LP01, LP00) on the multi-wire interface while operating in a low-power communication mode, followed by transmission of a high-speed data packet in the high-speed communication mode.

At step 627, the MIPI receiver (or slave) waits until completing transmission of the high-speed data to the MIPI transmitter, and then sends the abbreviated turnaround command by driving the specified code word sequence which signals a turnaround command to the master device while the physical interface operates in the low-power mode of operation. In selected embodiments, the MLPI receiver device uses turnaround control logic to transmit the specified code word sequence (e.g., LP10, LP00) on the multi-wire interface while operating in a low-power communication mode to cause the MIPI transmitter (or master device) to send a turnaround acknowledgment signal.

At step 628, the external MIPI transmitter (or master device) starts to send a high-speed packet to the MIPI receiver (or slave), such as by configuring the master device to transmit the first sequence of signaling states (e.g., LP11, LP01, LP00) on the multi-wire interface while operating in a low-power communication mode. If no turnaround is intended, the processing at step 628 can continue with the normal high-speed data transmission sequence.

Figure 7:
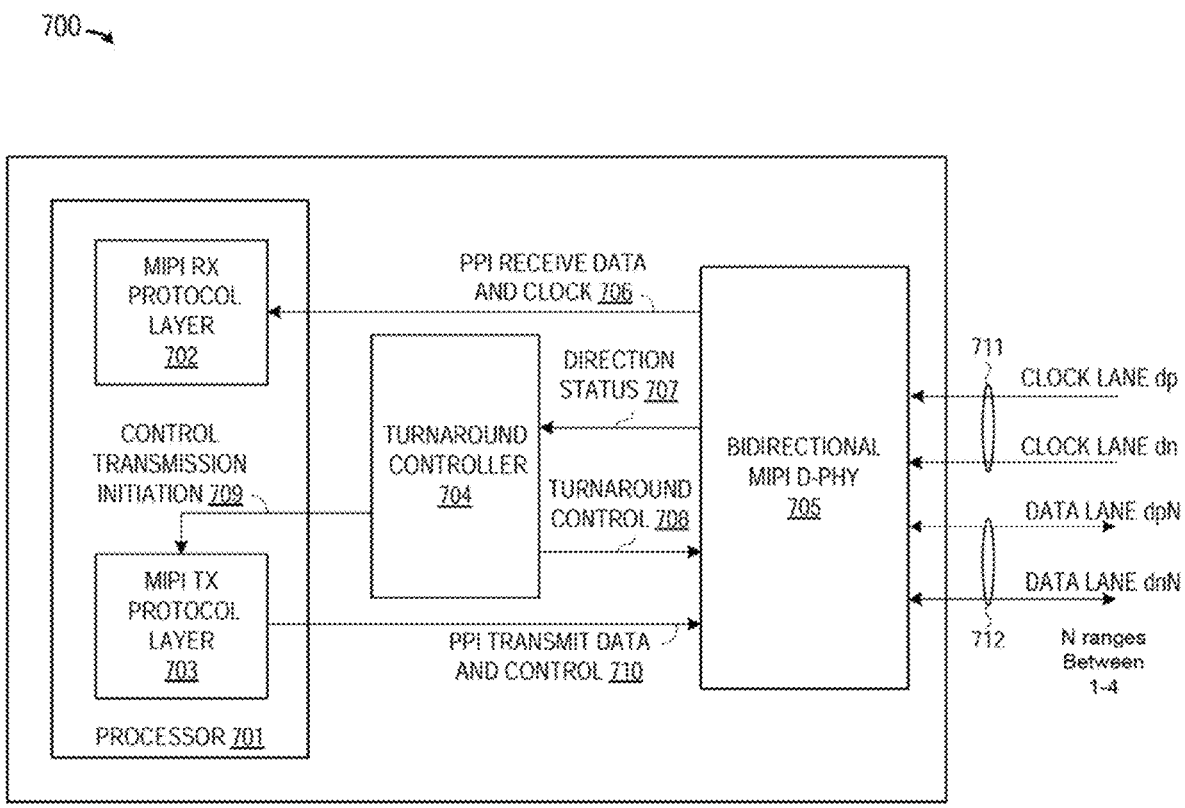
FIG. 7 depicts a simplified block diagram of a microcontroller in accordance with selected embodiments of the present disclosure.

To provide additional details for an improved contextual understanding of the present disclosure, reference is now made to FIG. 7 which depicts a simplified block diagram of an apparatus 700 which is configured to perform fast link turnaround using MIPI D-PHY communication interface 711-712 in accordance with selected embodiments of the present disclosure which uses an expedited reverse turnaround capability to send the data from the apparatus to the radar sensor in the chirp inactive time. In selected embodiments, the apparatus 700 may be implemented in hardware and/or software as a radar microcontroller unit which is connected as a slave device over the MIPI D-PHY communication interface 711-712 to an external master device, such as a radar sensor front end module (not shown). As illustrated, the apparatus 700 may be implemented with a processing circuit 710, turnaround controller 704, and bidirectional MIPI D-PHY 705 which are connected and configured to implement a modified MIPI D-PHY interface protocol in which a specified low power command sequence provides a reliable turnaround procedure having a fast link turnaround procedure, thereby providing longer interpacket gaps during which the (slave) apparatus can transmit high-speed data packets over the MIPI D-PHY communication interface 711-712 to the external (master) device.

Though not shown, it will be appreciated that the processing circuit 710, turnaround controller 704, and bidirectional MIPI D-PHY 705 may be connected with a bus architecture of one or more signal lines, represented generally by the bus lines 706-710, which may include any number of interconnecting buses and bridges depending on the specific application of the apparatus 700 and the overall design constraints. In whatever form, the bus links together various circuits including one or more processors and/or hardware modules, represented by the processor 701, the turnaround controller module or circuit 704, and the bidirectional MIPI D-PHY 705 that is configurable to communicate over connectors or wires of a multi-wire communication link 711-712. The bus may also link various other circuits, such as timing sources, peripherals, voltage regulators, and power management circuits.

The processing circuit 701 may be implemented with one or more processors that may include one or more of a microprocessor, microcontroller, digital signal processor, a sequencer and a state machine. In whatever, implementation, the processor 701 is responsible for general processing and the execution of software control instructions stored in memory to perform the functions described herein. In selected embodiments, the memory may be implemented with any suitable computer-readable storage medium for storing instructions and/or data that is manipulated by the processor 701 when executing software, including data decoded from symbols transmitted over the communication link 711-712, which may be configured as clock lanes 711 and data lanes 712.

As depicted, the apparatus 701 further includes at least one of the MIPI receiver (RX) protocol layer module 702, the MIPI transmitter (TX) protocol layer module 704, and the turnaround controller module 704. Each of the modules 702-704 which may be software modules running in the processor 701, resident/stored in the computer-readable storage medium, one or more hardware modules coupled to the processor 701, or some combination thereof. The modules 702-704 may include microcontroller instructions, state machine configuration parameters, or some combination thereof.

In connection with a first MIPI receiver (RX) protocol layer module 702, the processor circuit 701 is configured to receive and process received PHY-Protocol Interface (PPI) data and clock signals 706 that are provided by the bidirectional MIPI D-PHY 705. In this data reception mode, the bidirectional MIPI D-PHY 705 is configured to receive data in sequences of symbols using the multi-wire communication link 711-712. By default, the bidirectional MIPI D-PHY 705 is configured as a slave device to receive data from the external (master) device. In particular, the bidirectional MIPI D-PHY 705 may be configured to receive and decode a first code word (e.g., LP11, LP01, LP00) over the multi-wire communication link 711-712 from the external (master) device (e.g., a radar sensor) while the communication link 711-712 is configured to operate in a low-power mode of operation. In response to the first code word, the bidirectional MIPI D-PHY 705 reconfigures the communication link 711-712 to operate in a high-speed mode for receiving data from the external (master) device, and provides a "receive" direction status signal 707 to the turnaround controller module 704.

The bidirectional MIPI D-PHY 705 continues to operate the communication link 711-712 in a high-speed mode until the external (master) device signals the end of high-speed mode of operation, at which point the communication link 711-712 is configured to operate in a low-power mode of operation. At this point, the bidirectional MIPI D-PHY 705 may be configured to receive and decode an expedited turnaround command as a second code word (e.g., LP10, LP00) over the multi-wire communication link 711-712 from the external (master) device while the communication link 711-712 is still in a low-power mode of operation. In response to the second code word, the bidirectional MIPI D-PHY 705 provides a "transmit" direction status signal 707 to the turnaround controller module 704.

At the turnaround controller module 704, one or more modules and/or circuits respond to the "transmit" direction status signal 707 to reconfigure the direction of the bidirectional MIPI D-PHY 705 to return to a high-speed mode of operation for transmitting data from the (slave) apparatus 701 to the external (master) device. In particular, turnaround controller module 704 issues a turnaround control signal 708 to the bidirectional MIPI D-PHY 705 and also issues a control transmission initiation signal 709 to the MIPI transmitter (TX) protocol layer module 703 which generates PHY-Protocol Interface (PPI) data and clock signals 710 that are provided to the bidirectional MIPI D-PHY 705 for encoding and high-speed transmission over the multi-wire communication link 711-712 to the external (master) device. At this point, the bidirectional MIPI D-PHY 705 may be configured to encode and transmit the first code word (e.g., LP11, LP01, LP00) over the multi-wire communication link 711-712 to the external (master) device while the communication link 711-712 is configured to operate in a low-power mode of operation. In addition, the bidirectional MIPI D-PHY 705 reconfigures the communication link 711-712 to operate in a high-speed mode for transmitting data to the external (master) device until the (slave) apparatus 701 signals the end of high-speed mode of operation, at which point the communication link 711-712 is configured to operate in a low-power mode of operation to await reception of the first code word (e.g., LP11, LP01, LP00) over the multi-wire communication link 711-712 from the external (master) device to signal the initiation of another high-speed data transmission from the external (master) device.

In addition to being configured to receive and decode expedited turnaround commands, the bidirectional MIPI D-PHY 705 may also be configured to receive the packet from the link 711-712 and pass it on to the MIPI RX protocol layer 702 that depacketizes the data for further radar processing in the microcontroller 700. If the external (master) device had sent the packet with the extended turnaround command signaling (e.g., LP10, LP00, LP10, LP00), then the DPHY direction status 707 will change to transmit. This will be processed by the turnaround controller 704 which will interface with the MIPI TX protocol layer 703 that packetizes the data that microcontroller 700 wants to send during the reverse turnaround command, so as to generate and initiate DPHY packet transmission to the external (master) device. By sending the data packets to the external (master) device with the extended turnaround signaling, the external (master) device again becomes receiver after this packet reception. This means that the microcontroller 700 again comes back in slave or receive mode ready to receive packet from the external (master) device.

By now it should be appreciated that there has been provided an apparatus, method, program code, and system for operating a device coupled to a multi-wire interface, such as a microcontroller device connected to receive data over a multi-wire interface from a configurable radar sensor. In the disclosed embodiments, the device receives on the multi-wire interface a first sequence of signaling states within a first voltage range during a low-power communication mode to cause the device to transition to a high-speed communication mode. In selected embodiments, the first sequence of signaling states may be a received LP code sequence, LP11, LP01, LP00. In addition, the devices receive on the multi-wire interface first high-speed data within a second, smaller voltage range while operating in the high-speed communication mode before returning to the low-power communication mode for a first time. Subsequently, the device receives on the multi-wire interface a second sequence of two signaling states within the first voltage range during the low-power communication mode to signal a turnaround command without requiring any additional signaling state within the first voltage range. In selected embodiments, the second sequence of two signaling states may be a received LP code sequence, LP10, LP00. Upon receipt of the turnaround command, the device is enabled to transmit data from the device over the multi-wire interface. Thus enabled, the device transmits on the multi-wire interface the first sequence of signaling states within the first voltage range to cause the device to transition to a high-speed communication mode for transmitting data from the device over the multi-wire interface, and then transmits on the multi-wire interface second high-speed data within the second, smaller voltage range while operating in the high-speed communication mode before returning the multi-wire interface to the low-power communication mode for a second time. In some embodiments, the device receives on the multi-wire interface a third sequence of signaling states within the first voltage range to signal an acknowledgement of the turnaround command transmitted by the device before being enabled transmitting the second high-speed data. In other embodiments, the device transmits the second high-speed data without receiving on the multi-wire interface an acknowledgement of the turnaround command transmitted by the device. In selected embodiments, the multi-wire interface may be embodied as a D-PHY interface defined by Mobile Industry Processor Interface (MIPI) Alliance specifications. In such embodiments, the first voltage range may span approximately 1.2 Volts and the second voltage range may span less than 600 millivolts. In selected embodiments, the disclosed apparatus, method, program code, and system provide for a turnaround time of approximately 400-450 nanoseconds between when the multi-wire interface returns to the low-power communication mode for a first time and when the second high-speed data begins transmitting on the multi-wire interface.

In another form, there is provided an apparatus, method, program code, and system for operating communications over a two-wire interface which may, in selected embodiments, be implemented as a D-PHY interface defined at least in part by Mobile Industry Processor Interface (MIPI) Alliance specifications. In the disclosed apparatus, a bidirectional physical interface is adapted to convert data to sequences of two-phase symbols for transmission on the two-wire link and to convert sequences of two-phase symbols received on the two-wire link into data. In addition, the apparatus includes a processor that is configured to control transmission and reception over the two-wire link. In particular, the processor is configured to receive and decode high-speed data on the two-wire link while operating in a high-speed communication mode, where the high-speed data is received within a first voltage range before returning to a low-power communication mode for a first time. In addition, the processor is configured to decode a first sequence of two signaling states (e.g., the LP code sequence, LP10, LP00) received on the two-wire link within a second, larger voltage range during the low-power communication mode to signal a turnaround command without requiring any additional signaling state within the first voltage range, where the turnaround command enables the apparatus to transmit data over the two-wire link. In selected embodiments, the first voltage range spans less than 600 millivolts and the second, larger voltage range spans approximately 1.2 Volts. The processor is also configured to transmit, in response to the turnaround command, second high-speed data over the two-wire link in the high-speed communication mode, wherein the second high-speed data is transmitted within the first voltage range. In selected embodiments, the processor is configured to transmit second high-speed data by first transmitting, in response to the turnaround command, a sequence of signaling states on the two-wire link (e.g., the LP code sequence, LP11, LP01, LP00) while operating in the low-power communication mode, where the sequence of signaling states are transmitted within the second, larger voltage range to cause the apparatus to transition to a high-speed communication mode; and then transmitting first high-speed data over the two-wire link to the receiver while operating in the high-speed communication mode, wherein the first high-speed data is transmitted within the first voltage range that is less than the second voltage range. In selected embodiments, the processor may also be configured to transmit second high-speed data only after decoding a third sequence of signaling states received on the two-wire link within the second, larger voltage range to signal an acknowledgement of the turnaround command transmitted by the apparatus. In selected embodiments, the disclosed apparatus, method, program code, and system provide for a turnaround time of approximately 400-450 nanoseconds between when the two-wire link returns to the low-power communication mode for a first time and when the second high-speed data begins transmitting on the two-wire link.

In yet another form, there is provided an apparatus, method, program code, and system for operating communications over a multi-wire interface which may, in selected embodiments, be implemented as a D-PHY interface defined at least in part by Mobile Industry Processor Interface (MIPI) Alliance specifications. In the disclosed method, method is operative to transmit to a slave device connected to the multi-wire interface a first sequence of signaling states within a first voltage range (e.g., 1.2 Volts) during a low-power communication mode to cause the device to transition to a high-speed communication mode. In addition, the disclosed method is operative to transmit to the slave device over the multi-wire interface first high-speed data within a second, smaller voltage range (e.g., 600 mVolts) while operating in the high-speed communication mode before returning to the low-power communication mode for a first time. The disclosed method is also operative transmit to the slave device over the multi-wire interface a second sequence of two signaling states (e.g., the LP code sequence, LP10, LP00) within the first voltage range during the low-power communication mode to signal a turnaround command without requiring any additional signaling state within the first voltage range, where the turnaround command enables the slave device to transmit data over the multi-wire interface to the device. In addition, the disclosed method is operative to receive from the slave device over the multi-wire interface the first sequence of signaling states within the first voltage range to cause the device to transition to a high-speed communication mode for receiving data from the slave device over the multi-wire interface. Finally, the disclosed method is operative to receive from the slave device over the multi-wire interface second high-speed data within the second, smaller voltage range while operating in the high-speed communication mode before returning the multi-wire interface to the low-power communication mode for a second time.

Although the described exemplary embodiments disclosed herein focus on modifications to the MIPI D-PHY communication protocol and methods for using same, the present invention is not necessarily limited to the example embodiments illustrate herein and may be applied to any multi-wire signaling system that uses defined codewords to signal a change in transmission direction. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method performed in a device coupled to a multi-wire interface, comprising:
  receiving on the multi-wire interface a first sequence of signaling states within a first voltage range during a low-power communication mode to cause the device to transition to a high-speed communication mode;
  receiving on the multi-wire interface first high-speed data within a second, smaller voltage range while operating in the high-speed communication mode before returning to the low-power communication mode for a first time;
  receiving on the multi-wire interface a second sequence of only two signaling states within the first voltage range during the low-power communication mode to signal a turnaround command without requiring any additional signaling state within the first voltage range, where the turnaround command enables the device to transmit data from the device over the multi-wire interface;
  transmitting on the multi-wire interface the first sequence of signaling states within the first voltage range to cause the device to transition to a high-speed communication mode for transmitting data from the device over the multi-wire interface; and
  transmitting on the multi-wire interface second high-speed data within the second, smaller voltage range while operating in the high-speed communication mode before returning the multi-wire interface to the low-power communication mode for a second time.

2. The method of claim 1, wherein the multi-wire interface comprises a D-PHY interface defined by Mobile Industry Processor Interface (MIPI) Alliance specifications.

3. The method of claim 2, where the first voltage range spans approximately 1.2 Volts and the second voltage range spans less than 600 millivolts.

4. The method of claim 1, where receiving the first sequence of signaling states comprises receiving an LP code sequence, LP11, LP01, LP00.

5. The method of claim 1, where receiving the second sequence of two signaling states comprises receiving an LP code sequence, LP10, LP00.

6. The method of claim 1, further comprising receiving on the multi-wire interface a third sequence of signaling states within the first voltage range to signal an acknowledgement of the turnaround command transmitted by the device before transmitting the second high-speed data.

7. The method of claim 1, where the device transmits the second high-speed data without receiving on the multi-wire interface an acknowledgement of the turnaround command transmitted by the device.

8. The method of claim 1, where a turnaround time of approximately 400-450 nanoseconds is required between when the multi-wire interface returns to the low-power communication mode for a first time and when the second high-speed data begins transmitting on the multi-wire interface.

9. An apparatus comprising:
a two-wire link;
a bidirectional physical interface adapted to convert data to sequences of two-phase symbols for transmission on the two-wire link and to convert sequences of two-phase symbols received on the two-wire link into data; and
a processor configured to:
receive and decode high-speed data on the two-wire link while operating in a high-speed communication mode, where the high-speed data is received within a first voltage range before returning to a low-power communication mode for a first time;
decode a first sequence of only two signaling states received on the two-wire link within a second, larger voltage range during the low-power communication mode to signal a turnaround command without requiring any additional signaling state within the first voltage range, where the turnaround command enables the apparatus to transmit data over the two-wire link; and
transmit, in response to the turnaround command, second high-speed data over the two-wire link in the high-speed communication mode, wherein the second high-speed data is transmitted within the first voltage range.

10. The apparatus of claim 9, where the processor is configured to transmit second high-speed data by:
transmitting, in response to the turnaround command, a sequence of signaling states on the two-wire link while operating in the low-power communication mode, where the sequence of signaling states are transmitted within the second, larger voltage range to cause the apparatus to transition to a high-speed communication mode; and
transmitting first high-speed data over the two-wire link to the receiver while operating in the high-speed communication mode, wherein the first high-speed data is transmitted within the first voltage range that is less than the second voltage range.

11. The apparatus of claim 9, where the two-wire link comprises a D-PHY interface defined at least in part by Mobile Industry Processor Interface (MIPI) Alliance specifications.

12. The apparatus of claim 11, where the first voltage range spans less than 600 millivolts and the second voltage range spans approximately 1.2 Volts.

13. The apparatus of claim 10, where the sequence of signaling states comprises an LP code sequence, LP11, LP01, LP00.

14. The apparatus of claim 9, where first sequence of two signaling states comprises an LP code sequence, LP10, LP00.

15. The apparatus of claim 9, where the processor is further configured to transmit second high-speed data only after decoding a third sequence of signaling states received on the two-wire link within the second, larger voltage range to signal an acknowledgement of the turnaround command transmitted by the apparatus.

16. The apparatus of claim 9, where a turnaround time of approximately 400-450 nanoseconds is required between when the two-wire link returns to the low-power communication mode for the first time and when the second high-speed data begins transmitting on the two-wire link.

17. A method performed in a device coupled to a multi-wire interface, comprising:
transmitting to a slave device connected to the multi-wire interface a first sequence of signaling states within a first voltage range during a low-power communication mode to cause the device to transition to a high-speed communication mode;
transmitting to the slave device over the multi-wire interface first high-speed data within a second, smaller voltage range while operating in the high-speed communication mode before returning to the low-power communication mode for a first time;
transmitting to the slave device over the multi-wire interface a second sequence of no more than two signaling states within the first voltage range during the low-power communication mode to signal a turnaround command without requiring any additional signaling state within the first voltage range, where the turnaround command enables the slave device to transmit data over the multi-wire interface to the device;
receiving from the slave device over the multi-wire interface the first sequence of signaling states within the first voltage range to cause the device to transition to a high-speed communication mode for receiving data from the slave device over the multi-wire interface; and
receiving from the slave device over the multi-wire interface second high-speed data within the second, smaller voltage range while operating in the high-speed communication mode before returning the multi-wire interface to the low-power communication mode for a second time.

18. The method of claim 17, wherein the multi-wire interface comprises a D-PHY interface defined by Mobile Industry Processor Interface (MIPI) Alliance specifications.

19. The method of claim 18, where the first voltage range spans approximately 1.2 Volts and the second voltage range spans less than 600 millivolts.

20. The method of claim 19, where transmitting the second sequence of two signaling states comprises transmitting an LP code sequence, LP10, LP00.

* * * * *